United States Patent [19]
Donat

[11] Patent Number: 5,168,109
[45] Date of Patent: Dec. 1, 1992

[54] PROCESS FOR PREPARING LOW INHERENT VISCOSITY-HIGH GLASS TRANSITION AGENTS AS AN OVERPOLYMER ON POLYVINYL CHLORIDE RESINS

[75] Inventors: Frank J. Donat, Mantua, both of Ohio

[73] Assignee: B. F. Goodrich Company, Brecksville, Ohio

[21] Appl. No.: 590,972

[22] Filed: Oct. 1, 1990

Related U.S. Application Data

[60] Continuation-in-part of Ser. No. 295,428, Jan. 10, 1989, abandoned, which is a division of Ser. No. 85,669, Aug. 14, 1987, Pat. No. 4,814,387, which is a division of Ser. No. 496,705, Mar. 21, 1990, abandoned, which is a division of Ser. No. 85,668, Aug. 14, 1987, Pat. No. 4,927,886.

[51] Int. Cl.⁵ .......................................... C03F 259/04
[52] U.S. Cl. .................................. 525/261; 525/279; 525/285; 525/289
[58] Field of Search ................ 525/261, 285, 289, 279

[56] References Cited

U.S. PATENT DOCUMENTS

| | | |
|---|---|---|
| 3,644,577 | 2/1974 | Lee et al. . |
| 3,919,137 | 11/1975 | Dyer et al. . |
| 3,997,704 | 12/1976 | Aurichio ........................ 525/261 |
| 4,267,084 | 5/1981 | Mizutani et al. ................ 525/227 |
| 4,448,580 | 5/1984 | Abe et al. . |
| 4,480,076 | 10/1984 | Melby et al. . |

FOREIGN PATENT DOCUMENTS 941085 1/1974 Canada .

*Primary Examiner*—Jacob Ziegler

[57] ABSTRACT

Various fabrication properties of polyvinyl chloride are improved such as melt flow by treating the polyvinyl chloride resin with a low inherent viscosity-high glass transition temperature enhancing agent. The treatment occurs as a suspension or mass overpolymerization on the polyvinyl chloride resin by reacting at least one high glass transition temperature enhancing agent with at least one chain transfer agent. The formed high glass transition temperature-low inherent viscosity agent imparts a high glass transition temperature to the polyvinyl chloride resin and also reduces the inherent viscosity to a level below the inherent viscosity formed by the combined effect of the polyvinyl chloride resin and the glass transition temperature agent.

9 Claims, No Drawings

PROCESS FOR PREPARING LOW INHERENT VISCOSITY-HIGH GLASS TRANSITION AGENTS AS AN OVERPOLYMER ON POLYVINYL CHLORIDE RESINS

This is a continuation-in-part of U.S. patent application Ser. No. 07/295,428 filed Jan. 10, 1989 now abandoned, which is a division of application Ser. No. 07/085,669 filed Aug. 14, 1987, now U.S. Pat. No. 4,814,387 and U.S. patent application Ser. No. 07/496,705 filed Mar. 21, 1990 now abandoned, which is a divisional of application No. 07/085,668 filed Aug. 14, 1987, now U.S. Pat. No. 4,927,886.

FIELD OF THE INVENTION

The present invention relates to an overpolymerization of high glass transition temperature-inherent viscosity enhancing agents on polyvinyl chloride resin with the treated resin being particularly suitable for various melt type fabrication processes and applications.

BACKGROUND OF THE INVENTION

Heretofore, certain types of polymers or copolymers were blended with polyvinyl chloride (PVC) resins to increase the glass transition temperature thereof. Such blends containing the glass transition temperature improving polymers or copolymers generally were unsatisfactory for various melt type fabrication processes such as custom injection molding (CIM) applications. When glass transition temperature improving polymers or copolymers having a low inherent viscosity in and of themselves were blended with PVC resins, the powder flux in various processing devices such as an extruder, a Banbury, a mill, or an injection molding machine, was often unsatisfactory. Hence, glass transition temperature polymers or copolymers were utilized having high inherent viscosities. Such high inherent viscosities decreased the melt flow when blended with PVC and limited the usefulness thereof in melt type fabrication processes.

SUMMARY OF THE INVENTION

It is therefore an aspect of the present invention to provide a treated PVC resin suitable for melt type processes and fabrication applications. It is also an aspect to provide a low inherent viscosity-high glass transition temperature agent treated PVC resin which is easily processed, has excellent melt flow properties with regard to melt type processes, and has excellent dispersion of the glass transition treating agent therein. The PVC resin can be any type of resin as made by mass, emulsion, suspension, or dispersion polymerization with mass and suspension resins being preferred. The treated PVC resin preferably is made by a suspension process whereby a mixture of the chain transfer agent, the high glass transition temperature agent forming monomers and initiators are applied to the PVC resin and are usually absorbed thereon. The PVC resin with the applied mixture thereon is suspended in water and the overpolymerization of the high glass transition temperature agent forming monomers occurs on the PVC resin at suitable temperatures. Some grafting of the monomers to the PVC resin occurs. The chain transfer agents are substantially water insoluble compounds such as various alkyl mercaptans, the various alkenes or benzoalkenes containing at least one allylic hydrogen atom, the various chlorinated or bromonated alkanes, alkenes, or alkynes and the various high molecular weight aldehydes. The amount of water utilized in the suspension overpolymerization of the high glass transition temperature enhancing agent and the chain transfer agent is usually small to make efficient use of a reaction vessel.

The treated PVC resin may also be made by a mass reaction of chain transfer agents and high glass transition temperature agent forming monomers along with a free radical initiator applied to the resin as through overpolymerization thereon whereby some grafting to the resin occurs.

The invention will be better understood by reference to the following detailed description.

DETAILED DESCRIPTION

In accordance with the present invention, generally any polyvinyl chloride particulate resin can be utilized such as resin made by suspension polymerization, dispersion polymerization, emulsion polymerization, mass polymerization, and other types of polymerization as well known to the art and to the literature. It is preferred that the polyvinyl chloride resin be a homopolymer. Various copolymers of polyvinyl chloride resin can also be utilized although such is not preferred in the present invention. Such comonomers are well known to the art and to the literature with a few representative examples including the various vinyl halides, the various vinylidene halides, vinyl acetate, esters of acrylic acid, esters of methacrylic acid, various alkenes, and the like. It is also to be understood that by the term polyvinyl chloride is included chlorinated polyvinyl chloride resins containing a total of from about 57% to about 72% by weight of chloride therein.

The polyvinyl chloride particulate resins of the present invention, and especially the preferred homopolymer, are treated with the high glass transition temperature-inherent viscosity enhancing treating agent before the application thereto of any compounding aids, processing aids, conventional additives, and the like. As noted above, the high glass transition temperature-inherent viscosity enhancing treating agent is preferably made by the suspension polymerization of a high glass transition temperature agent forming monomers and a low inherent viscosity enhancing agent on the polyvinyl chloride particles, that is as a suspension overpolymerization. The high glass transition temperature-inherent viscosity enhancing treating agent may also be made by a mass polymerization to form an overpolymer of a high glass transition temperature agent forming monomers and a low inherent viscosity enhancing agent on the polyvinyl chloride particles.

Generally, any conventional or polyvinyl chloride glass transition temperature enhancing agent as well as those known to the art and to the literature can be utilized to increase the glass transition temperature of the polyvinyl chloride resin. Such agents are generally polymers or copolymers containing conventional amounts of the various components and are made from one or more styrene type monomers such as styrene, alpha-methylstyrene, para-methylstyrene, vinyl nitriles such as acrylonitrile and methacrylonitrile, the various esters of methacrylic acid such as methylmethacrylate, the various maleimides, the various indenes, the various norbornenes including norbornadiene, the various unsaturated acid anhydrides such as maleic anhydride, including derivatives thereof, as well as combinations of the above. Preferred glass transition temperature enhancing agents of the present invention include styrene, acrylonitrile, alpha-methylstyrene, with a copolymer of alpha-methylstyrene and acrylonitrile being highly preferred.

The high glass transition temperature enhancing agent forming monomers are generally utilized as a basis with regard to the other components of the present invention. Accordingly, the amount of polyvinyl chloride particulate resin utilized is generally from about 50 to about 2,000 parts by weight for every 100 parts by weight of the glass transition temperature forming monomers. A more desired amount of the polyvinyl chloride particulate resin is from about 75 parts to about 500 parts by weight, preferably from about 100 to about 350 parts by weight with from about 125 to about 300 parts by weight being highly preferred based upon 100 parts by weight of the high glass transition forming monomers. On a percentage basis based upon the amount of overpolymerization, that is the amount of the high glass transition temperature agent forming monomers, the chain transfer agent and the polyvinyl chloride particulate resin, the amount of the high glass transition temperature forming agents is from about 5% to about 70%, and preferably from about 25% to about 45% by weight. Naturally, the high glass transition temperature enhancing agents impart or increase the glass transition temperature of the various polyvinyl chloride particulate resins utilized. Such increase in the glass transition temperature of the resulting overpolymerized polyvinyl chloride particulate resin is generally at least 5° C., desirably at least 12° C., and preferably at least 20° C.

It is an important aspect of the present invention that chain transfer agents be utilized during the polymerization of the high glass transition temperature agent forming monomers, that is monomers which when polymerized form the high glass transition temperature enhancing agents of the present invention. The utilization of chain transfer agents has been found to impart low melt viscosity, that is to reduce the inherent viscosity of the glass transition temperature enhancing agents, apparently by shortening the chain length thereof, and hence also reduces the overall inherent viscosity of the overpolymerized treated polyvinyl chloride particulate resin.

The overpolymerization reaction of the high glass transition temperature agent forming monomers with the chain transfer agents may occur as a suspension reaction, that is in the presence of water and the polyvinyl chloride particulate resin. Inasmuch as polyvinyl chloride is an organic compound, it forms a separate phase in the water. Since the suspension polymerization occurs essentially and primarily through agitation, that is, no emulsifiers, surfactants, suspending agents, and the like are utilized, the high glass transition temperature agent forming monomers as well as the chain transfer agents will migrate to the polyvinyl chloride particles and react thereon, and, hence, the overpolymerization reaction. The amount of water utilized in the suspension overpolymerization reaction can vary over a very wide range. For example, up to near infinite amounts of water can be utilized. However, to make efficient use of the reaction vessel, small amounts of water are desirably utilized. The amount of water utilized is generally based upon the solids content of the solution and hence of the polyvinyl particulate resin, as well as the high glass transition temperature monomer. Desirably, the amount of water is such that the total solids content, i.e., the amount of polyvinyl chloride particulate resin, is generally 5% or greater, desirably from about 10% to about 60%, and preferably from about 25% to about 50% by weight based upon the total weight of the solids and the water at the end of the polymerization.

In order for the chain transfer agents to be effective in a suspension reaction, they are generally water insoluble inasmuch as water soluble agents will dissolve within the water and, hence, not effect overpolymerization on the polyvinyl chloride particulate resin. The chain transfer agents must also be capable of reacting with the high glass transition temperature agent forming monomers and to impart low viscosities, that is, reduce the inherent viscosity of the glass transition temperature enhancing agents by apparently shortening the chain length thereof and hence reduce the average inherent viscosity of the overpolymerized polyvinyl chloride particulate resin. When the preferred types of polyvinyl chloride resins such as mass and suspension resins are utilized, the resins are generally porous and have voids, cracks, fissures, etc., therein. Hence, the reaction with regard to these types of resins is not solely a surface phenomenon since the reactants actually penetrate, permeate, or are absorbed into the porous polyvinyl chloride polymer and thus the reaction also occurs therein. Naturally, the overpolymerization is carried out in the presence of an inert atmosphere such as nitrogen, or the like.

According to the concepts of the present invention, polymerization may occur via a mass reaction, that is, without water, a suspension medium, emulsifiers, etc. Water, as in suspension polymerization, is avoided since the type of chain transfer agent which can be utilized is somewhat limited and difficulties may be encountered removing the chain transfer agent from the polyvinyl chloride resin. The overpolymerization reaction involves a mixture of the chain transfer agents with the glass transition temperature agent forming monomers which are applied to the polyvinyl chloride particulate resin in the presence of free radical initiators with the polymerization reaction being carried out thereon in an inert atmosphere such as nitrogen. It is noted that the overpolymerization reaction often involves grafting of a minor amount of the reactant compounds on the polyvinyl chloride resin. Inasmuch as the polyvinyl chloride particles are somewhat porous, polymerization not only occurs on the surface thereof, but also within the pores, the voids, the cracks, the fissures, etc., thereof. Hence, the reaction is not solely a surface phenomenon since it actually penetrates, permeates, or is absorbed and thus the reaction also occurs within the polyvinyl chloride particle. The porous nature of the polyvinyl chloride resin also results in good dispersion of the formed low inherent viscosity-high glass transition temperature enhancing agent.

When using the mass process, the reaction of the high glass transition temperature agent forming monomers with an effective amount of the chain transfer agent is carried out in an oxygen-free environment as in an enclosed vessel, for example, an autoclave having an agitator, mixer, etc., therein. Suitable types of such mixing reaction vessels include a ribbon blender, rotating autoclaves, a convention agitation suspension polymerization vessel, and the like. The method of preparation comprises adding polyvinyl chloride resin to the vessel and purging the air therefrom through the use of a vacuum and an inert gas, for example, nitrogen, carbon dioxide, etc. Once the vessel has been purged, suitable and effective amounts of the high glass transition temperature agent forming monomers and the chain transfer agents are added thereto. Catalysts such as free radical initiators are generally desired. The chain transfer agents, the glass transition temperature agent forming monomers, the free radical initiator, and the polyvinyl chloride resin are mixed in the reaction vessel with the glass transition temperature agent being polymerized at suitable times and temperatures. Since the monomer is added to the vessel and mixed with the polyvinyl chloride resin, it coats as well as penetrates the porous resin. Overpolymerization is thus achieved. That is, the polymerization of the high glass transition temperature agent forming monomers occurs in situ on and in the polyvinyl chloride particles. Since desirably no water is utilized in the reaction, a mass polymerization occurs.

The chain transfer agents of the present invention can generally be any substantially water insoluble or water soluble organic compound which contains an active hydrogen or an active halogen. When the suspension process is used, the chain transfer agents should be substantially water insoluble. For the mass process, either water insoluble or water soluble chain transfer agents may be used. By the term "substantially water insoluble", it is meant that the solubility of the chain transfer agent is generally less than 20 grams and desirably less than 10 grams per 100 grams by weight of water. A suitable class of a water insoluble chain transfer agent are the various alkyl mercaptans having from 5 to 22 carbon atoms which are generally water insoluble. Generally, the higher molecular weight alkyl mercaptans are preferred such as those having 8 to about 18 carbon atoms. Examples of specific alkyl mercaptans include t-decyl mercaptan, t-dodecyl mercaptan, t-octyl mercaptan, and the like. When using the mass process the compounds are generally alkyl mercaptans having from 1 to 22 carbon atoms with from 5 to 18 carbon atoms being preferred. It is noted that water soluble mercaptans can also be utilized in the mass process even though the reaction with the glass transition temperature agent forming monomers are carried out in a mass reaction, that is, without water. Such water soluble chain transfer agents are generally ineffective when utilized in a suspension polymerization. Another class or group of chain transfer agents which can be utilized in the mass process are the various mercaptan alcohols such as those having from 2 to about 22 carbon atoms with from 2 to 12 carbon atoms being preferred. Specific example include 2-mercaptoethanol, 3-mercapto-1,2-propanediol, and 3-mercaptopropionic acid, and the like. Another type of chain transfer agent are the various alkenes or benzoalkenes (i.e., aromatic alkenes) which contain at least one allylic hydrogen atom and having a total of from about 3 to 20 carbon atoms, and preferably from 3 to 12 carbon atoms, such as propene, 1-butene, 2-butene, indene, and the like. The various chlorinated or brominated alkanes, alkenes or alkynes having 1 to 12 carbon atoms can also be utilized with specific examples including chloroform, bromoform, trichloroethylene, allylchloride, and the like. Another class of suitable chain transfer agents are the aldehydes having from 1 to 15 carbon atoms, such as formaldehyde, and acetaldehyde. The water insoluble aldehyde compounds generally are only the compounds which have at least 6 carbon atoms or at least 8 carbon atoms to about 15 carbon atoms such as hexanal. For the suspension process, the alkyl mercaptans are preferred with t-dodecyl mercaptan, t-octyl mercaptan, and t-decyl mercaptan being highly preferred. Another chain transfer agent which can be utilized quite effectively in the mass process is $H_2S$ gas. Generally, $H_2S$ and the alkyl mercaptans are desired in the mass process with the various mercaptan alcohols being preferred. An especially preferred compound for use in the mass process is 2-mercaptoethanol.

As noted above, the overpolymerization of the various high glass transition temperature enhancing agent forming monomers on the polyvinyl chloride particles increases the inherent viscosity of the polyvinyl chloride resin. Accordingly, an amount of chain transfer agent is utilized so that upon reaction with the high glass transition temperature agent, the inherent viscosity of the overall composition, that is, the overpolymerized polyvinyl chloride particulate resin is reduced. Desirably, the inherent viscosity is reduced to at least the original inherent viscosity of the polyvinyl chloride particles, that is to the inherent viscosity level of the polyvinyl chloride resin before any overpolymerization reaction thereon. More desirably, the reduction is to at least 5% and preferably at 15% below the inherent viscosity of the original polyvinyl chloride resin, that is, before any overpolymerization reaction thereon. When the compositions of the present invention are utilized with regard to custom injection molding applications or processes, inherent viscosity of the overpolymerized polyvinyl chloride particulate resin is generally from about 0.25 to about 0.7, and preferably from about 0.4 to about 0.6. For extrusion applications, the inherent viscosity can be about 0.7 to about 1.2 and preferably from about 0.5 to about 1.2. The inherent viscosity is measured in accordance with ASTM 358C which briefly involves utilizing 0.2 grams of the treated polyvinyl chloride resin dissolved in same 50 ml of cyclohexanone solvent at 25° C.

In order to achieve the above-noted inherent viscosity values, the effective amount of the chain transfer agent is generally from about 0.3 to about 20 milliequivalents per 100 parts by weight of the glass transition temperature agent forming monomers, desirably from about 1.0 to about 15 milliequivalents, and preferably from about 2 to about 10 milliequivalents.

In terms of parts, an effective amount of chain transfer agent is from about 0.005 parts by weight to about 4 parts by weight per 100 parts by weight of high glass transition temperature agent forming monomers. A preferred amount of chain transfer agent is from about 0.017 parts to about 3 parts and the most preferred amount of chain transfer agent is from about 0.03 parts to about 2 parts per 100 parts by weight of high glass transition temperature agent forming monomers. If a polymeric chain transfer agent is used, the amount of chain transfer agent should be determined based on the weight of the monomer(s) which operates as the chain transfer agent.

In the suspension process, reaction of the high glass transition temperature agent forming monomers with an effective amount of the water insoluble chain transfer agent and an oil soluble free radical initiator is carried out in an oxygen-free environment as in an enclosed vessel having a suitable mixing means to provide sufficient agitation to conduct the suspension polymerization. That is, inasmuch as surfactants, emulsifiers, etc., are not utilized, a true suspension reaction is conducted. Examples of such suitable mixing reaction vessels include a ribbon blender, rotating autoclaves, or a conventional polymerization vessel with sufficient agitation to keep the polyvinyl chloride resin and applied monomers, etc., freely suspended. The method of preparation comprises adding polyvinyl chloride to the reactor and purging air therefrom through the use of a vacuum and an inert gas, for example, nitrogen, carbon dioxide, and the like. Once the vessel has been purged, suitable and effective amounts of the high glass transition temperature agent forming monomers, water and the chain transfer agents and an oil soluble free radical catalyst are added thereto. Catalysts such as free radical catalysts are generally utilized. The chain transfer agents, the glass transition temperature agent forming monomers, water, and the polyvinyl chloride resin are mixed in the reaction vessel with the glass transition temperature agent monomers being polymerized at suitable temperatures and times. Inasmuch as the monomer is organic and since its system does not include emulsifiers, surfactants, etc., the monomer migrates to the organic polyvinyl chloride resin phase where it coats as well as penetrates any porous resin. Overpolymerization is thus achieved. That is, polymerization of the high glass transition temperature agent forming monomers occurs in situ on and in the polyvinyl chloride resin.

The initiators are desirably oil soluble and water insoluble with high water insolubility being preferred. Two specific groups or classes of free radical initiators are the various azo type initiators as well as the various peroxide type initiators. Examples of specific azo type initiators include 2,2'-azobis(2,4-dimethyl-2-methoxyvaleronitrile), 2,2'-azobis(isobutyronitrile), and the like. Numerous peroxide initiators are known to the art and to the literature and various types thereof can be utilized such as diacyl peroxides, ketone peroxides, peroxydicarbonates, peroxyesters, dialkyl peroxides, hydroperoxides, peroxyketals, and the like. Examples of specific peroxides include decanoyl peroxide, lauroyl peroxide, benzoyl peroxide, alpha-cumylperoxy pivalate, t-butylperoxy neodecanoate, t-butylperoxy pivalate, t-butylperoxyisobutylate, t-butylperoxy acetate, t-butylperoxy benzoate, dicumyl peroxide, di-t-butyl peroxide, t-butylhydroperoxide, 2,2-di(t-butylperoxy)-butane, and the like. The amount of the initiators is generally small as from about 0.05 parts to about 1.0 parts by weight and desirably from about 0.10 to about 0.75 parts by weight for every 100 parts by weight of the glass transition temperature agent forming monomers.

The time of the reaction as well as the temperature can naturally vary depending upon the amount of initiator utilized as well as the type of initiator. As a rule of thumb, polymerization of the high glass transition temperature agent forming monomers in the presence of chain transfer agents generally occurs at about 40° C. to about 90° C. with a temperature range of about 50° C. to about 85° C. being preferred. When a suspension process is used, the overpolymerized PVC resin is readily separated from the suspension solution as through filtering, centrifuging, etc.

The low inherent viscosity-high glass transition temperature treated polyvinyl chloride resins of the present invention have several advantages including a low cost to produce because of low raw material and manufacturing costs. Excellent dispersion of the high glass transition temperature agent forming monomers is also obtained. According to the present invention, the ability to utilize existing suspension and mass polyvinyl chloride plant equipment, the ability to utilize polymerized polyvinyl chloride which has not been stripped of its residual monomer, or that has been only partially stripped, all offer advantages with the present invention. Also, excellent melt flow characteristics for utilization in processing equipment such as injection molding equipment, and the like, offer advantages.

The treated polyvinyl chloride resins of the present invention can thus be utilized in various melt type fabrication processes such as extrusion, compression molding, blow molding, injection molding, and the like. The present invention is particularly suitable for custom injection molding. Examples of articles which thus can be produced utilizing the overpolymerized resin of the present invention include bottles, TV housings, pipe fittings, battery jars, appliance housings, and the like. The invention will be better understood by reference to the following examples.

EXAMPLES

Examples I and II are presented to demonstrate the invention using the suspension polymerization process. Examples III and IV are presented to demonstrate the invention using a mass polymerization process.

EXAMPLE I

General charging procedure, polymerization conditions and work up procedure used for all bottle suspension polymerizations are shown below, except where noted.

Charging Procedure

Quart pop bottles were charged by carefully weighing the dry powder PVC, adding the boiled distilled water (carefully weighed), and then adding the solution containing the monomers, initiators, and chain transfer agent, if used (also carefully weighed). The charging was carried out under a nitrogen atmosphere taking special care to eliminate oxygen. The bottles were sealed with a rubber lined cap and pressured with 10 psi nitrogen.

Polymerization Conditions

The charged, sealed bottles were placed in a 60° C. (unless noted otherwise) constant temperature water bath and tumbled for 16 hours. The bottles were then removed from the water bath, cooled and degassed before removing the cap.

Work-up

The contents of the bottles were poured on individual suction filters to remove water. Resuspended in isopropanol, refiltered and then dried at 60° C. under vacuum to a negligible heat loss (this usually required about 24 hours drying time). The dried resins were weighed, the heat loss measured and the yield of polymer corrected for the volatile heat loss. The corrected yield was then used to calculate the percentage monomer conversion using the following formulation:

% Monomer Conversion =

$$100 \times \frac{\text{wt. dried overpolymer} - \text{wt. of precharged PVC}}{\text{weight of monomers} + \text{chain agent charged}}$$

Effects of the level of monomers charged on the properties of a methyl methacrylate/a-methyl styrene copolymer overpolymerized on PVC. All quantities are in grams. Weight ratio MMA/alpha-methyl styrene=90/100.

| Ingredients | 1 | 2 | 3 | 4 | 5 |
|---|---|---|---|---|---|
| PVC (0.54 I.V.) | 100 | 100 | 100 | 100 | 100 |
| Boiled Distilled Water | 400 | 400 | 400 | 400 | 400 |
| t-butyl Peroxypivalate | 0.3 | 0.3 | 0.3 | 0.3 | 0.3 |
| Methyl Methacrylate | 9.9 | 22.5 | 38.7 | 60.3 | 90 |
| Alpha-methyl Styrene | 1.1 | 2.5 | 4.3 | 6.7 | 10 |
| Property of Overpolymers | 1 | 2 | 3 | 4 | 5 |
| Weight % Monomers based on PVC | 10 | 20 | 30 | 40 | 50 |
| % Monomers Conversion | 14.3 | 89.1 | 95.1 | 97.0 | 97.9 |
| % by wt. non-PVC polymer (actual) | 1.6 | 18.4 | 29.0 | 39.4 | 49.6 |
| Glass transition Tg °C.* | 82.5 | 89.3 | 94.5 | 97.5 | 99.2 |
| Compounded Properties | 1 | 2 | 3 | 4 | 5 |
| Glass Transition Temp. Tg °C. | 81.2 | 81.0 | 94.6 | 97.3 | 99 |
| HDT C (D-684 @ 264 psi) | 67.5 | 73.0 | 77 | 79.5 | 80 |
| Izod Impact (ft. lbs/in. notch) | 2.7 | 2.0 | 1.4 | 1.2 | 1.1 |
| Density (grams/cc) | 1.33219 | 1.30113 | 1.28146 | 1.26465 | 1.2478 | duPont Model 1090B differential scanning calorimeter - TG °C. of the PVC by itself is 83.1° C.

| Rheology N(Poise × $10^{-4}$) | 1 | 2 | 3 | 4 | 5 |
|---|---|---|---|---|---|
| 190° C. @ 100 sec | 1.62 | 2.25 | 3.22 | 4.25 | 4.71 |
| 190° C. @ 500 sec | 0.65 | 0.83 | 1.25 | 1.49 | 1.53 |
| 190° C. @ 1000 sec | 0.43 | 0.56 | 0.75 | 0.88 | 0.89 |

| Compound Recipe: | Parts Per 100 Parts Overpolymer |
|---|---|
| Acrylic Processing Aid | 3 |
| Methacrylate-styrene butadiene toughener | 15 |
| Tin Stabilizer | 2 |
| Mineral Oil | 2 |
| Calcium Stearate | 2 |
| Calcium Carbonate | 2 |

The ingredients were carefully weighed, dry blended in a Warring blender for one minute and then milled for three minutes after the stock bands on the mill. The milling was carried out on a 6-inch electrically heated laboratory mill with the front roll of the mill at 300° F. and the rear roll at 280° F. The test samples were compression molded 5 minutes at 390° F.

The HDT test was carried out on unannealed bars ⅛" thick.

Rheology measured on a Sieglaff-McKelvey Rheometer 0.048708 cm die radius.

*duPont Model 1090B differential scanning calorimeter-TG ° C. of the PVC by itself is 83.1° C.

EXAMPLE II

Non-PVC Polymer = 80/10/10 wt. % MMA/alpha-methyl styrene/acrylonitrile

Effects of varying the molecular weight of the overpolymer on melt viscosity and heat distortion temp. Samples polymerized 16 hours at 65° C. Everything else is the same as in Example I.

| Compounded Properties | 1 | 2 | 3 | 4 | 5 |
|---|---|---|---|---|---|
| Glass Transition Temp. Tg °C. | 81.2 | 81.0 | 94.6 | 97.3 | 99 |
| HDT C (D-684 @ 264 psi) | 67.5 | 73.0 | 77 | 79.5 | 80 |
| Izod Impact (ft. lbs/in. notch) | 2.7 | 2.0 | 1.4 | 1.2 | 1.1 |
| Density (grams/cc) | 1.33219 | 1.30113 | 1.28146 | 1.26465 | 1.2478 |

| Rheology N(Poise × $10^{-4}$) | 1 | 2 | 3 | 4 | 5 |
|---|---|---|---|---|---|
| 190° C. @ 100 sec | 1.62 | 2.25 | 3.22 | 4.25 | 4.71 |
| 190° C. @ 500 sec | 0.65 | 0.83 | 1.25 | 1.49 | 1.53 |
| 190° C. @ 1000 sec | 0.43 | 0.56 | 0.75 | 0.88 | 0.89 |

| Compound Recipe: | Parts Per 100 Parts Overpolymer |
|---|---|
| Acrylic Processing Aid | 3 |
| Methacrylate-styrene butadiene toughener | 15 |
| Tin Stabilizer | 2 |
| Mineral Oil | 2 |
| Calcium Stearate | 2 |
| Calcium Carbonate | 2 |

The ingredients were carefully weighed, dry blended in a Warring blender for one minute and then milled for three minutes after the stock bands on the mill. The milling was carried out on a 6-inch electrically heated

| Ingredients | 1 | 2 | 3 | 4 | 5 | 6 |
|---|---|---|---|---|---|---|
| PVC (0.54 I.V.) | 100 | 100 | 100 | 100 | 100 | 100 |
| Boiled Distilled Water | 400 | 400 | 400 | 400 | 400 | 400 |

-continued

| | | | | | | |
|---|---|---|---|---|---|---|
| Monomer A | 50 | — | — | — | — | — |
| B | — | 50 | — | — | — | — |
| C | — | — | 50 | — | — | — |
| D | — | — | — | 50 | — | — |
| E | — | — | — | — | 50 | — |
| F | — | — | — | — | — | 50 |

| Monomer | Make-Up phr | A | B | C | D | E | F |
|---|---|---|---|---|---|---|---|
| MMA | 80 | 160 | 160 | 160 | 160 | 160 | 160 |
| Alpha-methyl styrene | 10 | 20 | 20 | 20 | 20 | 20 | 20 |
| Acrylonitrile | 10 | 20 | 20 | 20 | 20 | 20 | 20 |
| *Sulfole 120 variable | 0.8–2.5 | 1.60 | 2.0 | 2.4 | 3.0 | 4.0 | 5.0 |
| t-butyl peroxypivalate | 0.3 | **0.800 | 0.800 | 0.800 | 0.800 | 0.800 | 0.800 |

*t-dodecylmercaptan chain transfer agent
**75% solution in mineral oil

| Resin Properties | 100% PVC | 1 | 2 | 3 | 4 | 5 | 6 |
|---|---|---|---|---|---|---|---|
| % Monomer Conv. | — | 94.7 | 94.4 | 94.6 | 94.5 | 93.1 | 94.9 |
| I.V. (inherent viscosity cyclohexane @ 25° C. | 0.54 | 0.526 | 0.525 | 0.483 | 0.466 | 0.444 | 0.419 |
| Wt. % non-PVC polymer | | 32.5 | 32.3 | 32.3 | 32.3 | 31.9 | 32.2 |

| | 100% PVC[1] | 1 | 2 | 3 | 4 | 5 | 6 |
|---|---|---|---|---|---|---|---|
| Compounded Properties Heat Deflection[2] Temp. °C. | 75.5 | 81.0 | 85.0 | 85.0 | 84.0 | 83.0 | 82.0 |
| Rheology N (Poise × $10^{-4}$) | | | | | | | |
| 200° C. @ 100 sec. | 1.02 | 1.36 | 1.35 | 1.28 | 1.13 | 1.04 | 0.94 |
| 200° C. @ 1000 sec. | 0.32 | 0.36 | 0.34 | 0.33 | 0.33 | 0.31 | 0.28 |
| Izod (ft. lbs/inch notch) | 7.37 | 1.58 | 2.53 | 2.52 | 2.30 | 1.69 | 1.58 |

[1]Recipe and mixing conditions same as in Example I
[2]Heat deflection bars ¼" × ¼" × 6" Annealed 24 hours @ 80° C. ASTM D-684 264 psi

Conclusion

The heat deflection temperature remains nearly constant or actually increases while melt viscosity is significantly decreased. This result was truly unexpected. Thus, the heat deflection temperature can be raised while greatly improving processability leading to either faster extrusion rates in making extruded goods or being able to fill more intricate molds in injection molding.

As apparent from the above data, the inherent viscosities of polyvinyl chloride are reduced. Hence, higher molecular weight polyvinyl chloride resins can be utilized with regard to various melt processing operations wherein a reduced inherent viscosity is desired. Moreover, it can be seen from the above that the heat deflection values generally did not vary with the molecular weight of the overpolymer. This result was truly unexpected in that a decrease in molecular weight usually results in a decrease in heat deflection temperature. This is verified by the below example wherein it is shown that decreasing the molecular weight or I.V. of the backbone PVC to lower the melt viscosity and to improve the processability (no chain transfer agent) results in the expected lowering of the heat deflection temperature.

| | Exp. PVC A | Exp. PVC B |
|---|---|---|
| Experimental PVC A I.V. = 0.540 | | |
| Experimental PVC B I.V. = 0.465 | | |
| Heat Deflection Temp. °C. | 75.5 | 64.5 |
| Izod Impact (Ft. Lbs/Inch Notch) | 7.4 | 2.3 |
| Melt Viscosity (NPoise × $10^{-4}$) | | |
| 200° C. @ 100 sec. | 1.02 | 0.60 |
| 200° C. @ 1000 sec. | 0.32 | 0.23 |

As apparent from the above Table, lowering the PVC backbone molecular weight to lower melt flow viscosity results in a large drop in heat deflection temperature when no chain transfer agent was utilized.

EXAMPLE III

A quart beverage bottle was charged with the following formulation:

| | Formulation Pphm |
|---|---|
| Suspension Polyvinyl Chloride | 278 (I.V. = 0.54; Tg = 82° C.) |
| Alpha-methylstyrene | 69.1 |
| Acrylonitrile | 30.9 |
| Lauroyl Peroxide | 0.5 |
| t-butyl Peroctoate | 0.37 |

-continued

| | Formulation Pphm |
|---|---|
| 2-mercaptoethanol | 0.25 |
| 15 mm Steel Balls | 7 |

The above ingredients with the exception of the steel balls and the polyvinyl chloride were premixed and added to the particulate polyvinyl chloride resin in a beverage bottle which was initially purged with nitrogen.

Upon completion of charging, the beverage bottle was tumbled for approximately 16 hours at 65° C. A tail reaction was then conducted for approximately 2 hours at 80° C.

The mass overpolymerized polyvinyl chloride resin was then tested with regard to inherent viscosity, glass transition temperature and conversion of the glass transition temperature agent forming monomers. The results are set forth in the table below. In a similar manner, a controlled reaction was utilized having the same formulation as set forth above except that no chain transfer agent was utilized. The results thereof are also set forth in table below.

| | Ex. III | Control |
|---|---|---|
| I.V. | 0.509 | 0.720 |
| Tg, °C. | 91.8 | 95 |
| Conversion, % | 92.7 | 90.9 |

As apparent from the above data, utilization of the chain transfer agents via a mass overpolymerization resulted in a dramatic reduction in the inherent viscosity. The conversion was slightly higher. Accordingly, the treated polyvinyl chloride resin of the present invention has a greatly improved melt flow rate.

EXAMPLE IV

In an exact manner as set forth in Example III, a glass transition temperature agent treated polyvinyl chloride resin was prepared except that $H_2S$ gas was utilized as a chain transfer agent. The amount of $H_2S$ utilized was 0.25 parts by weight per 100 parts by weight of the monomer. The only other formulation differences were that 0.18 parts by weight of lauroyl peroxide and 0.26 parts by weight of t-butyl peroctoate were utilized per 100 parts by weight of monomer. The following data were obtained.

| | Ex. IV | Control |
|---|---|---|
| Shell/core | 0.33 | 0.33 |
| IV | 0.479 | 0.720 |
| Tg, °C. | 92.9 | 93.0 |
| Conversion, % | 92.1 | 90.9 |

As apparent, once again a very reduced inherent viscosity was obtained.

While in accordance with the Patent Statutes, a best mode and preferred embodiment have been set forth, the scope of the invention is not limited thereto, but rather by the scope of the attached claims.

What is claimed:

1. A process for treating a polyvinyl chloride resin, comprising the steps of:
    adding one or more polyvinyl chloride high glass transition temperature agent forming monomers to a polyvinyl chloride particulate resin contained in water, wherein amount of said polyvinyl chloride resin is from about 50 to about 2,000 parts by weight for every 100 parts by weight of said one or more monomers and wherein said one or more monomers are selected from the group consisting essentially of styrene-type monomers, vinyl nitriles, maleimides, indenes, norbornenes, unsaturated acid anhydrides, and mixtures thereof,
    adding from about 0.005 parts to about 4 parts of a substantially water insoluble chain transfer agent to said water and polyvinyl chloride particulate resin per 100 parts by weight of said one or more monomers, and
    suspension polymerizing in absence of a suspending agent said glass transition temperature agent forming monomers in the presence of said substantially water insoluble chain transfer agent so that said treated polyvinyl chloride resin has a reduced inherent viscosity.

2. A process according to claim 1, wherein said substantially water insoluble chain transfer agent is an alkyl mercaptan having from 5 to 22 carbon atoms, an alkene or an aromatic alkene having at least one allylic hydrogen atom and containing from 3 to about 20 carbon atoms, a chlorinated or brominated alkane, alkene or alkyne having from 1 to 12 carbon atoms, an aldehyde having from 6 to about 15 carbon atoms, or combinations thereof.

3. A process according to claim 2 wherein the amount of said polyvinyl chloride resin is from about 75 parts to about 500 parts by weight for every 100 parts by weight of said one or more monomers, wherein the amount of water in said suspension overpolymerization is such that the amount of polyvinyl chloride resin solids is from about 5% to about 60% by weight based upon the total weight of said solids and said water, wherein the amount of said substantially water insoluble chain transfer agent is from about 0.017 parts to about 3.0 parts for every 100 parts by weight of said one or more monomers, and wherein said treated polyvinyl chloride resin has an inherent viscosity reduction to at least 5% below the initial inherent viscosity of said polyvinyl chloride resin.

4. A process according to claim 3 wherein said substantially water insoluble chain transfer agent is said alkyl mercaptan having from about 8 to about 18 carbon atoms, and wherein said alkene or said aromatic alkene has at least one allylic hydrogen atom.

5. A process according to claim 4 wherein the amount of said polyvinyl chloride resin is from about 100 parts to about 350 parts by weight for every 100 parts by weight of said one or more monomers, and wherein the amount of said polyvinyl chloride solids is from about 25% to about 50% by weight based upon the total weight of said solids and said water.

6. A process according to claim 5 wherein said glass transition temperature agent forming monomers is alpha-methylstyrene, acrylonitrile, styrene, or combinations thereof, wherein said substantially water insoluble chain transfer agent is t-dodecyl mercaptan, t-decyl mercaptan, t-octyl mercaptan, or combinations thereof, and wherein said inherent viscosity reduction of said treated polyvinyl chloride resin is at least 15% below the initial inherent viscosity of said polyvinyl chloride resin.

7. A process according to claim 2 wherein said suspension polymerization is carried out by agitation.

8. A process according to claim 6 wherein said suspension polymerization is carried out by agitation, and wherein said inherent viscosity of said treated polyvinyl chloride resin is from about 0.25 to about 0.6.

9. A process according to claim 2 wherein the amount of chain transfer agent is from about 0.03 parts to about 2 parts.

* * * * *